United States Patent
Schiefer

[11] Patent Number: 5,176,481
[45] Date of Patent: Jan. 5, 1993

[54] EXPANSION DOWEL WITH FRICTION REDUCING COATING

[75] Inventor: Erwin Schiefer, Munich, Fed. Rep. of Germany

[73] Assignee: Hilti Aktiengesellschaft, Liechtenstein

[21] Appl. No.: 883,828

[22] Filed: May 15, 1992

[30] Foreign Application Priority Data

May 17, 1991 [DE] Fed. Rep. of Germany ....... 4116149

[51] Int. Cl.$^5$ ............................................ F16B 13/06
[52] U.S. Cl. .......................................... 411/60; 411/55; 411/70; 411/903
[58] Field of Search ....................... 411/55, 57, 60, 61, 411/69, 70, 71, 72, 74, 428, 903, 902

[56] References Cited

U.S. PATENT DOCUMENTS

| | | | |
|---|---|---|---|
| 2,518,468 | 8/1950 | Harding | 411/428 X |
| 3,709,089 | 1/1973 | Seetaram | 411/61 |
| 3,750,526 | 8/1973 | Lerich | 411/61 |
| 3,766,819 | 10/1973 | Giannuzzi | 411/60 |
| 4,688,977 | 8/1987 | Seetaram | 411/61 |
| 4,702,654 | 10/1987 | Frischmann et al. | 411/55 |

*Primary Examiner*—Neill R. Wilson
*Attorney, Agent, or Firm*—Anderson Kill Olick & Oshinsky

[57] ABSTRACT

An expansion dowel has a friction reducing coating on the contacting surfaces formed by an inside surface an an expansion sleeve and an outside surface of the shank contacting the inside surface of the sleeve. The coating effects a smaller friction value between the expansion sleeve and the expansion part than the friction value between the expansion sleeve and the surface of a borehole into which the dowel is inserted. This difference in friction assures an effective re-expansion of the expansion dowel in a fractured or broken tensile zone of a receiving material containing the borehole. In addition to the coating, protrusions arranged in pairs are formed on the outside surface of the expansion sleeve for maintaining contact with the borehole surface, particularly in the broken tensile zone during large displacement of the expansion dowel.

10 Claims, 1 Drawing Sheet

EXPANSION DOWEL WITH FRICTION REDUCING COATING

BACKGROUND OF THE INVENTION

The present invention is directed to an expansion dowel including an anchor bolt having a axially extending cylindrical shank with an expansion part at one end and means at the other end for securing a member to a receiving material into which the dowel is anchored. At least an axially extending portion of the anchor bolt shank is enclosed by an expansion sleeve displaceable relative to the bolt. The expansion sleeve has at least one axially extending slot open at its end closer to the expansion part and it is provided on its outside surface with radially projecting protrusions.

Expansion dowels of this type are used for securing workpieces to a receiving material such as a structural component, where a bore in the component and a bore in the workpieces are similarly dimensioned, so that after the workpiece is arranged in the desired attachment position, the expansion dowel can be pushed through the bores aligned with one another. By turning engagement means, such as a nut with a suitable tool, the expansion part on the anchor bolt is pulled into the expansion sleeve whereby the sleeve anchors itself in the structural component when it is expanded by the expansion part.

A dowel is disclosed in GB-PS 1 333 893 where the anchor bolt is located at the inner end of the expansion sleeve and, upon installation, the expansion sleeve is forced outwardly at the base of the bore. The expansion dowel is made up of an elongated cylindrical anchor bolt with a conically shaped expansion part at one end and a widenable expansion sleeve positioned on the anchor bolt. The expansion sleeve has protrusions stamped outwardly from the inside of the sleeve. The protrusions are arranged so that they project outwardly from the largest circumference of the anchor bolt or expansion sleeve.

The expansion force developed after the expansion dowel has been set, produces essentially a friction force of equal magnitude between the anchor bolt and the expansion sleeve and between the borehole surface and the expansion sleeve. As a result, such an expansion dowel has an extremely unfavorable re-expansion character, for instance, in a fractured or broken tension zone in the receiving material, since displacement of the anchor bolt relative to the expansion sleeve cannot be assured. Due to the basically equal frictional forces, the expansion sleeve can move together with the anchor bolt relative to the bore hole surface. The protrusions on the expansion sleeve serve for stationary retention of the expansion sleeve in the borehole when the expansion dowel is being anchored. These protrusions are not located on the radially expandable region of the sleeve and, accordingly, do not fulfill the corresponding holding function in the fractured tension zone.

Additionally, it is known that expansion dowels of this type, formed of stainless steel, tend to "corrode or wear" between the anchor bolt and the expansion sleeve. Especially with expansion dowels used where the tension zone can fracture, it is important to avoid this "corroding phenomenon" to assure a secure re-tightening in the fractured zone.

SUMMARY OF THE INVENTION

The primary object of the present invention is to provide an expansion dowel which can be economically manufactured and has an effective re-tightening characteristic in fractured or broken tension zones.

In accordance with the present invention, two protrusions are formed in a pair spaced apart in the axial direction of the dowel and located on the outside surface of the expansion sleeve and at least one of the contacting surfaces between the inside of the expansion sleeve and the outside of the anchor bolt shank is provided with a friction reducing coating. Due to the invention, the friction between the anchor bolt and the expansion sleeve is lower than the friction between the borehole surface and the expansion sleeve. Additionally, the disadvantageous entrainment of the expansion sleeve during setting of the expansion dowel is prevented.

Preferably, the friction reducing coating is an anti-friction lacquer. The anti-friction lacquer achieves the complete separation of the sliding faces in most cases by means of a lubricating film. The anti-friction lacquer can be applied with a thickness of 5 to 30 micrometers. Further, the coating can be applied as a metal layer by metallization, for instance, using molybdenum or aluminum.

The invention deals with laminated solid lubricants with or without a layer lattice structure. Graphite, molybdenum sulfide and tungsten sulfide are among the solid lubricants with a layered lattice structure. Among the solid lubricants without the layered lattice structure are, among others: polymers, as for instance polytetraflouroethylene and polyethylene.

The laminated solid lubricants molybdenum sulfide and graphite enjoy the widest application. The lubricating efficiency is based on the layered or stratified lattice structure and the electrical charges of the boundary layer. The laminated package can carry high transverse loads with slight axial displacement friction.

In a preferred embodiment, the coating can be an alkali resistant resin system. As a result, the coating is chemically resistant against all harmful effects stemming from concrete, the environment or weather effects.

Advantageously, the resin system is based on epoxy resin. This involves a pressure setting plastics with various advantages, such as good adhesion to nearly all materials, high resistance against chemicals, especially against alkalis, high strength and a favorable aging behavior.

Preferably, the resin system contains a solid lubricant. Molybdenum sulfide, graphite and polytetraflouroethylene are particularly suitable materials as the solid lubricant. These are lubricants with or without a layered lattice structure. Only slight cohesive forces exist between the individual layers, affording easy displacement of the layers relative to one another. As distinguished from the expansion sleeve, the anchor bolt shank has a closed surface and the application of a uniform thickness coating is possible.

In a preferred embodiment, three pairs of the protrusions are distributed around the circumference of the expansion sleeve. For improved expandability of the expansion sleeve, it is provided with three slots extending axially for at least a portion of the length of the sleeve from its leading end in the insertion direction.

The slots divide the sleeve into expansion segments with a pair of protrusions formed on each segment.

The protrusions project in the radial direction outwardly from the outside surface of the expansion sleeve and assure contact between the sleeve and the borehole surface, even if fractures develop in the region of the borehole. As a result, the expansion sleeve can retain its axial position and assure the re-expansion of the dowel.

In an advantageous arrangement, the protrusions are beveled in the insertion direction of the dowel and are formed with sharp edges in the opposite direction. Due to the beveled arrangement, the expansion dowel can be more easily introduced into a borehole in the structural component and also pass through a bore in the workpiece. To assure the re-expansion character of the expansion dowel in a fractured tensile zone, the protrusions are shaped similar to barbs. In the event of axial movement of the expansion dowel opposite to the insertion direction, the protrusions dig in a more effective manner into the borehole surface and thus enable axial displacement of the anchor bolt relative to the expansion sleeve.

The protrusions located closer to the leading end of the dowel are preferably beveled up to the outside surface of the expansion sleeve. The angle of the bevel is in the range of 10° to 30° relative to the dowel axis. With this configuration, as the expansion dowel is inserted, it is assured that the expansion sleeve is compressed in the radial direction. Accordingly, the diameter of the leading end of the expansion sleeve is smaller during the insertion step than the diameter at the opposite or trailing end of the expansion sleeve. The protrusions located closer to the leading end of the expansion sleeve are formed as knife-edged rings, which dig into the borehole surface as the anchor bolt is tightened. The protrusions located rearwardly of the knife-edged rings are shaped as tangs or lugs and with increasing expansion are forced into the borehole surface. The dimension of the tangs and of the knife-edged rings in the circumferential direction corresponds approximately to one or two times the wall thickness of the expansion sleeve.

If larger displacements of the anchor bolt occur, especially in the fractured tensile zone, the tangs maintain contact with the borehole surface. This is of great significance, especially if the knife-edged rings progressively lose contact with the borehole surface through the axially extending banana shaped deformation of the segments of the expansion sleeve.

The preferred height of the knife-edged rings and tangs corresponds approximately to 0.4 to 0.5 times the wall-thickness of the expansion sleeve.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive manner in which there are illustrated and described preferred embodiments of the invention.

DETAILED DESCRIPTION OF THE INVENTION

Figure 1:
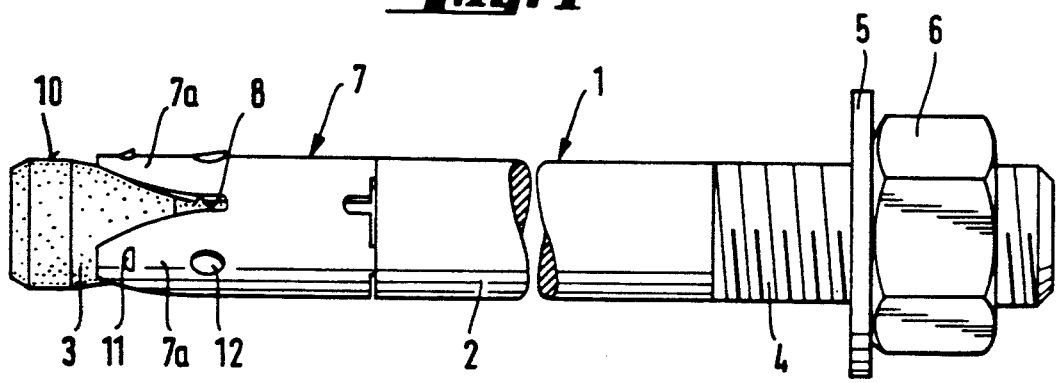
FIG. 1 is a partial side view of an expansion dowel embodying the present invention.

In FIG. 1 an expansion dowel is illustrated having a first or leading end at the left and a second or trailing end at the right, in other words, the left end leads as the dowel is inserted into a borehole in a receiving material in which it is to anchored. The anchor bolt has a cylindrical shank 2 extending axially from its second end towards the first end and a conically shaped expansion part 3 located adjacent the first end. At the second end, engagement means in the form of a thread 4, a washer 5 and a nut 6 are provided for securing a component to the receiving material into which the expansion dowel is anchored. Adjacent the first end, the anchor bolt has a reduced diameter section 1a as compared to the diameter of the cylindrical shank 2. The reduced diameter section extends up to the smaller diameter end of the expansion part 3.

Figure 3:
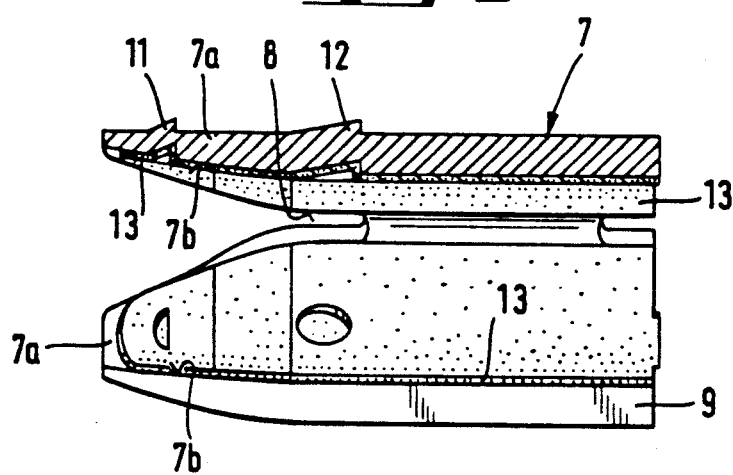
FIG. 3 is an enlarged sectional view of the expansion sleeve.

The reduced diameter section 1a is laterally enclosed by a displaceable expansion sleeve 7. The expansion sleeve 7 has three slots extending from its leading end toward the trailing end with two of the slots extending for a portion of the axial dimension of the sleeve and the other slot extending for its full axial dimension. As can be seen in FIG. 3, slots 8 extend for half of the axial dimension of the expansion sleeve 7 while the slot 9 extends for the full axial dimension of the sleeve. As a result, the expansion sleeve is divided into three expansion segments 7a and two radially outwardly directed protrusions 11, 12 spaced apart in the axial direction are arranged on each of the expansion segments.

Figure 2:
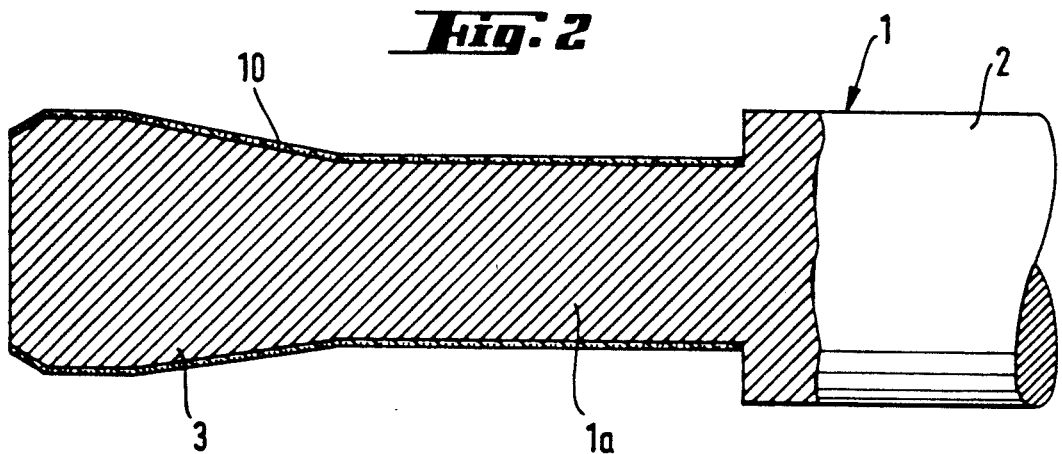
FIG. 2 is an enlarged side view, partly in section, of the leading end of the anchor bolt shank of the expansion dowel illustrated without the expansion sleeve.

As shown in FIG. 2, the leading end section of the anchor bolt 1 including the expansion part 3 and the reduced diameter section 1a in which the expansion sleeve is positioned, is coated.

The expansion part 3 on the leading end region of the anchor bolt 1 is shown enlarged in FIG. 2. The expansion part has an axially extending conical surface tapering inwardly toward the second end of the anchor bolt until it reaches the reduced diameter section 1a. This entire leading end region including the axially extending section on which the expansion sleeve is fitted, has a friction reducing coating 10.

FIG. 3 shows a section through the expansion sleeve 7. The pairs of protrusions 11, 12 arranged in the expansion segment 7a can be easily noted. The leading protrusions 11 closer to the leading end of the dowel are knife-edged ring sections. The trailing protrusions 12 are shaped in the form of tangs. Both of the protrusions 11, 12 are beveled in the insertion direction, in other words they slope inwardly toward the leading end of the dowel. Due to the configuration of the protrusions 11, 12 as the expansion dowel is inserted into a borehole, it experiences radial reduction in its leading end region. The protrusions 11, 12 have radially outwardly directed sharp edges at their trailing ends and, as a result, they can dig into the borehole surface when the anchor bolt is tightened and drawn opposite to the insertion direction into the expansion sleeve.

As can be seen in FIG. 3, the inside diameter of the expansion sleeve 7 increases in a step-wise manner toward the leading end. The knife-edged ring sections in the expansion segment 7a are located in the increased diameter section 7b. The axially extending sectional region 7b widens in a conical manner. The tang shaped protrusions 12 are located in the axially extending region of the expansion sleeve 7 having the maximum wall thickness.

The expansion sleeve 7 has a friction reducing coating 13 on its inside surface, and as far as the structure is concerned the coating 13 can be the same as coating 10 shown in FIG. 2.

While specific embodiments of the invention have been shown and described in detail to illustrate the application of the inventive principles, it will be understood that the invention may be embodied otherwise without departing from such principles.

I claim:

1. Expansion dowel comprising an axially extending anchor bolt having a first end and a second end with the first end leading in the insertion direction when the dowel is inserted into a borehole, said bolt comprises an axially extending cylindrical shank having a first diameter and extending from the second end toward the first end, an axially extending expansion part having a conically shaped outside surface converging toward the second end is located adjacent the first end, means at the second end of said bolt for securing a member to a structure into which the dowel is anchored, an axially extending shank section having a second diameter smaller than the first diameter is located between the cylindrical shank and the expansion part, said shank section has an outer surface, the expansion part has a smaller diameter end with approximately the same diameter as the second diameter, an expansion sleeve positioned on and laterally enclosing the shank section between the cylindrical shank and the expansion part, said expansion sleeve has a first end closer to the first end of said bolt and a second end closer to the second end of said bolt, said expansion sleeve being axially displaceable relative to said anchor bolt, said expansion sleeve has at least one axially extending slot therein open at the first end thereof, radially projecting protrusions on said expansion sleeve, said expansion sleeve having an axially extending inside surface and an axially extending outside surface, wherein the improvement comprises that said protrusions are arranged in a pair spaced apart in the axial direction and projecting radially outwardly from the outside surface of said expansion sleeve, the inside surface of said sleeve and the outside surface of said expansion part are coacting contacting surfaces and at least one of the inside surface of said sleeve and the outside surface of said expansion part has a friction reducing coating thereon.

2. Expansion dowel, as set forth in claim 1, wherein the coating is an anti-friction lacquer.

3. Expansion dowel, as set forth in claim 1, wherein said coating is an alkali-resistant resin system.

4. Expansion dowel, as set forth in claim 3, wherein the resin system is based on an epoxy resin.

5. Expansion dowel, as set forth in claim 3, wherein the resin system is based on a polyurethane resin.

6. Expansion dowel, as set forth in claim 4 or 5, wherein the resin system contains a solid lubricant.

7. Expansion dowel, as set forth in claim 1, wherein the coating is deposited on the expansion part and on the shank section.

8. Expansion dowel, as set forth in claim 1, wherein three pairs of the protrusions are arranged on the expansion sleeve spaced uniformly apart in the circumferential direction.

9. Expansion dowel, as set forth in claim 1, wherein the protrusions are beveled inwardly toward the first end of the anchor bolt and are formed with sharp edges along an edge spaced more remotely from the leading end.

10. Expansion dowel, as set forth in claim 9, wherein the protrusions closer to the leading end of the anchor bolt are beveled inwardly to the outside surface of the expansion sleeve.

* * * * *

UNITED STATES PATENT AND TRADEMARK OFFICE
CERTIFICATE OF CORRECTION

PATENT NO. : 6,176,481 B1
DATED : January 23, 2001
INVENTOR(S) : Ohkoda

It is certified that error appears in the above-identified patent and that said Letters Patent is hereby corrected as shown below:

Title page,
Item [56] References Cited:
FOREIGN PATENT DOCUMENTS, "131647" should read -- 57-131647 --, and "225227" should read -- 2-225227 --.

Column 2,
Line 19, "recording medium" should read -- recording-medium --.

Column 5,
Line 32, "driven" should read -- driven by --.

Column 9,
Line 37, "above described" should read -- above-described --.

Column 13,
Line 3, "a" should read -- at --.

Column 14,
Line 32, "abovemen-" should read -- above-men- --.

Column 15,
Line 9, "through" should read -- though --.

Column 16,
Line 32, "undergoing" should read -- undergone --.
Line 55, "effect," should read -- effect: --.

Column 19,
Line 22, "sheet." should read -- sheet, --.

Column 20,
Line 33, "and" should be deleted.

UNITED STATES PATENT AND TRADEMARK OFFICE
CERTIFICATE OF CORRECTION

PATENT NO. : 6,176,481 B1
DATED : January 23, 2001
INVENTOR(S) : Ohkoda

It is certified that error appears in the above-identified patent and that said Letters Patent is hereby corrected as shown below:

Column 21,
Line 53, "tape" should read -- type --.

Column 22,
Line 16, "a" should read -- up --.
Line 65, "and" should read -- and, --.

Signed and Sealed this

Thirtieth Day of October, 2001

Attest:

NICHOLAS P. GODICI
Attesting Officer
Acting Director of the United States Patent and Trademark Office